United States Patent [19]

Millet

[11] Patent Number: 5,168,502
[45] Date of Patent: Dec. 1, 1992

[54] METHOD OF INFORMATION TRANSMISSION IN A NETWORK FOR DATA TRANSMISSION OVER A RADIO CHANNEL AND SYSTEM FOR WHICH THE METHOD IS IMPLEMENTED

[75] Inventor: Guy Millet, Vanves, France

[73] Assignee: U.S. Philips Corporation, New York, N.Y.

[21] Appl. No.: 496,551

[22] Filed: Mar. 19, 1990

[30] Foreign Application Priority Data

Mar. 17, 1989 [FR] France ................. 89 03524

[51] Int. Cl.⁵ .......................... G08C 25/02; H04M 3/22
[52] U.S. Cl. .......................................... 371/32; 371/35; 455/33.4
[58] Field of Search ................. 371/32, 33, 35; 455/33

[56] References Cited

U.S. PATENT DOCUMENTS

| | | | |
|---|---|---|---|
| 4,352,183 | 9/1982 | Davis et al. | 371/33 |
| 4,697,281 | 9/1987 | O'Sullivan | 455/33 |
| 4,720,829 | 1/1988 | Fukasawa et al. | 371/32 |
| 4,829,554 | 5/1989 | Barnes et al. | 455/33 |
| 4,908,828 | 3/1990 | Tikalsky | 371/32 |
| 4,995,097 | 2/1991 | Leclerc | 455/33 |
| 5,010,553 | 4/1991 | Scheller et al. | 371/32 |
| 5,020,132 | 5/1991 | Nazarenk et al. | 455/33 |

FOREIGN PATENT DOCUMENTS

8804496  6/1988  PCT Int'l Appl.

OTHER PUBLICATIONS

M. Darnell et al., "Problems of Mobile HF Communication & Techniques For Performance Improvement", IEEE Proceedings, vol. 132, Pt. F, No. 5, Aug. 1985, pp. 433–440.

P. J. Cadman et al., "Data Transmission over VHF & UHF Land Mobile Radio Channels", IEEE Proceedings, vol. 130, Part F, No. 6, Oct. 1983, pp. 527–531.

Primary Examiner—Charles E. Atkinson
Attorney, Agent, or Firm—David R. Treacy

[57] ABSTRACT

A method of information transmission over a radio channel useful in the field of mobile radio, in which information is sent by the mobile stations broken up into fragments protected by an error detection and correction code. The information is received by one or various fixed receive stations $RC_1, \ldots, RC_n$ transmitting the received fragments to a central station CS after having specified them (rank, quality), which central station restores the information signals by performing the logic addition of all received correct fragments, eliminating the fragments that have already been received and requesting a repetition of the fragments that have not been received.

5 Claims, 4 Drawing Sheets

METHOD OF INFORMATION TRANSMISSION IN A NETWORK FOR DATA TRANSMISSION OVER A RADIO CHANNEL AND SYSTEM FOR WHICH THE METHOD IS IMPLEMENTED

BACKGROUND OF THE INVENTION

1. Field of the Invention

The present invention has for its object to provide a method of information transmission in a network for data transmission over a radio channel, constituted by a central station, a fixed send station, various fixed receive stations operating in the space diversity mode and various mobile send/receive stations. The invention likewise relates to the system for which said method of information transmission is implemented.

2. Description of the Prior Art

In networks of this type data transmission over a radio channel between mobile and fixed stations poses a technical problem relating to the selection of the fixed receive station that is to present the best operation when the mobile station changes place or is located at the boundary of the zones (space-diversity reception) and thus relating to the choice of the selection criterion of the fixed station that will ensure the best reception.

The conventional solution consists of making the choice of the receive station in dependence on a criterion of the quality of a radio link, for example, using the receiver that presents the best signal-to-noise ratio, or rather selecting the receiver that presents the lowest error rate. Such a solution is known and utilized, for example, in the operating system of the Liege district bus service (Belgium).

However, implementation of this solution does have a drawback. In effect, when the mobile station changes place or when it is situated at the zone boundary, the message that is transmitted might be lost and in order to avoid losing this message, a control has to be effected to select the fixed station with respect to the changed position of the mobile station.

SUMMARY OF THE INVENTION

The present invention has for its object to provide a method of the type mentioned hereinbefore which does not present the drawback of the prior-art method.

Therefore, the information transmission method of the type mentioned in the preamble is characterised in that the information sent by each mobile station and received by at least one fixed receive station is broken up into fragments each protected by an error detection and correction code, said received information subsequently being sent to the central station while the rank and the quality of the fragments are specified, which central station thus restores the information in accordance with a method of restoring information by performing a logic addition of all received correct fragments, the fragments already received being eliminated whereas a repetition of the fragments that have not been received is requested.

Thus, the breaking up of information into specified fragments as well as the protection thereof by means of an error detection and correction code recommended by various administrations (P.T.T., cf. Spéfication Technique CNET ST/PAA/DIR/1382, January 1987) make an effective restoration of said information possible. The main advantage of such a method resides in the fact that it is no longer necessary to select the fixed receive station(s) since the information is restored by reassembling the fragments which may then come from various fixed receive stations sending to the central station the received fragments and indicating the rank and quality of the fragments (correct fragment or not).

BRIEF DESCRIPTION OF THE DRAWING

The following description relating to the annexed drawings, all this given by way of example, will make it better understood how the invention can be realised, in which.

DETAILED DESCRIPTION OF THE PREFERRED EMBODIMENT

Figure 1:
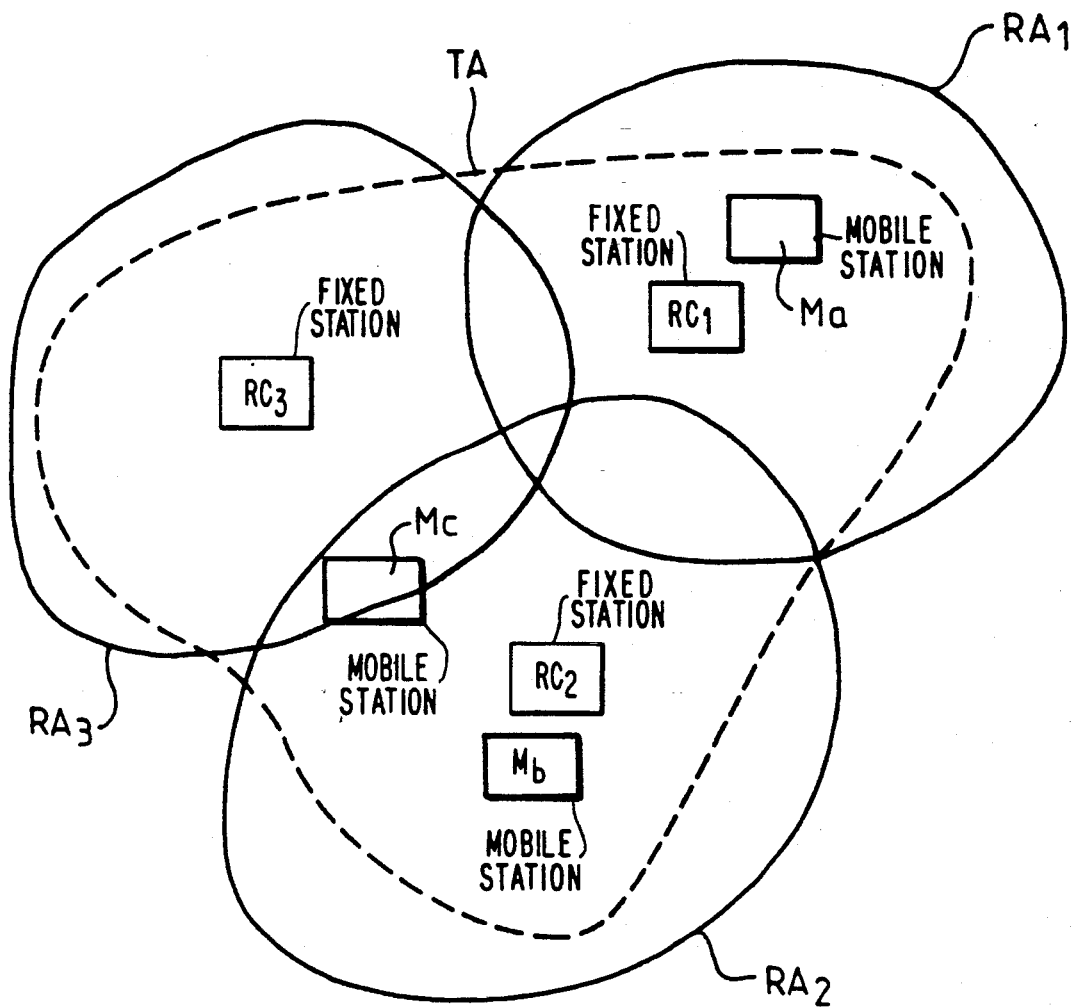
FIG. 1 shows in a very schematic manner a configuration of a network for data transmission over a radio channel.

In FIG. 1 an example is proposed of the configuration of a network for data transmission over a radio channel. The transmission network comprises a fixed send station that is able to send to various mobile stations Ma, Mb, Mc, . . . , the radio coverage area of the fixed send station being represented by the zone TA bounded by a dashed line. The network also comprises a central station $RC_1$, $RC_2$, $RC_3$ . . . and various fixed receive stations operating in space diversity and whose service areas are bounded by the solid lines $RA_1$, $RA_2$, $RA_3$, . . . . The central station is connected to the fixed receive stations by means of digital links.

In order to have a better understanding of the invention a simple example is considered relating to the mobile send/receive stations referenced Ma, Mb, Mc in the Figure. When the mobile stations Ma and Mb as situated in FIG. 1 send out information, generally no problem will arise as regards the selection of the fixed receive station. In effect, the information sent by the station Ma is, in this case, certainly received only by the fixed station whose service area is bounded by the line $RA_1$, the information sent by station Mb is likewise certainly received only by the fixed station whose service area is bounded by the line $RA_2$. If, in contradistinction thereto, it is the station Mc as situated in FIG. 1 that sends out information, a problem arises concerning the choice of the fixed receive station because the information may thus be received by the stations whose service areas are bounded by the lines, $RA_2$ and $RA_3$. In conformity with the present innovative idea this problem is resolved in that the information sent by the mobile station Mc and broken up into fragments, each protected by an error detection and correction code, is received by the latter two fixed receive stations whose service areas are bounded by the lines $RA_2$ and $RA_3$, is subsequently transmitted to the central station while specifying the rank and quality of said fragments, which central station restores the information by performing a logic addition of all received correct fragments, the fragments already received being eliminated whereas a repetition of the fragments that have not been received is requested.

Figure 2:
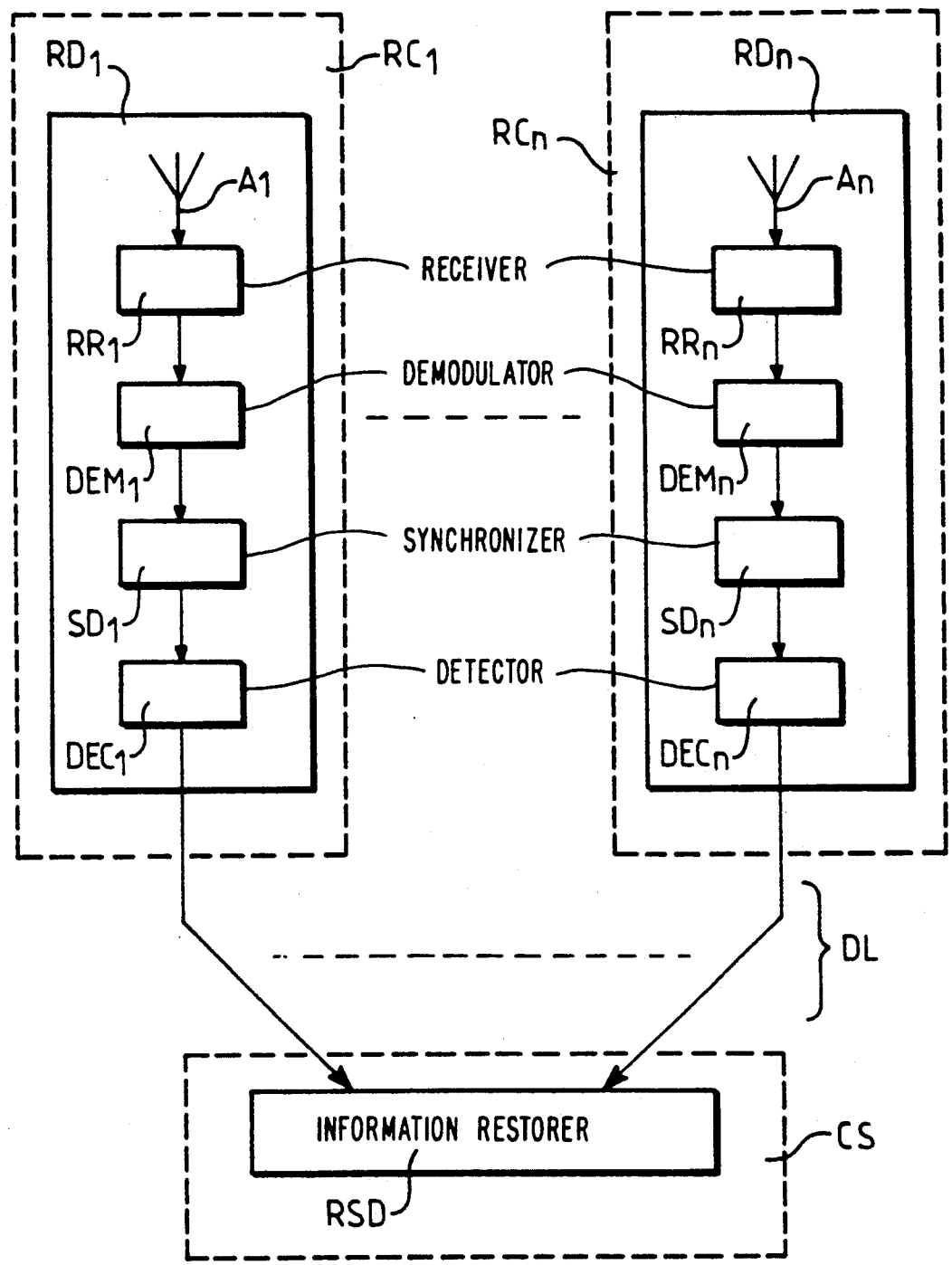
FIG. 2 shows the receive and restoration arrangements for information sent by the mobile stations.

In FIG. 2 are represented the arrangements for receiving and restoring information transmitted by the mobile stations. Each fixed receive station $RC_1$, $RC_2$, ..., $RC_n$ comprises, for example, a receive arrangement $RD_1$, $RD_2$, ..., $RD_n$ charged with receiving and processing the information fragments coming from the mobile stations and then, after processing, causing the fragments to arrive at the central station CS. The information transmitted over a radio channel by the mobile stations is received at the fixed receive station $RC_1$, ..., $RC_n$ by the receive arrangement $RD_1$, ..., $RD_n$ via an aerial $A_1$, ..., $A_n$, connected to the radio receiver $RR_1$, ..., $RR_n$. At the output of the receiver the signal BF is demodulated by means of a demodulator $DEM_1$, ..., $DEM_n$, then applied to a synchronisation arrangement $SD_1$, ..., $SD_n$, at the output of which the signal broken up into fragments is monitored by an error correction and detection arrangement $DEC_1$, ..., $DEC_n$ with which it is possible to specify the rank and the quality of each fragment (correct fragment or not). The fragments marked thus are transmitted to the central station CS over digital links DL known per se utilizing, for example, modems.

The central station CS comprises, for example, an information restoring arrangement RSD for restoring said information on the basis of fragments marked and transmitted by the set of fixed receive stations $RC_1$, ..., $RC_n$. Therefore, the arrangement RSD implements a restoring method (to be described with reference to FIG. 3) according to which a logic addition is performed of all the received correct fragments, the fragments already received being eliminated whereas a repetition of fragments that have not been received is requested. The arrangement RSD may be a microprocessor 11 cooperating with a set of read only memories 12 and random access memories 13 in the station CS.

Figure 3:
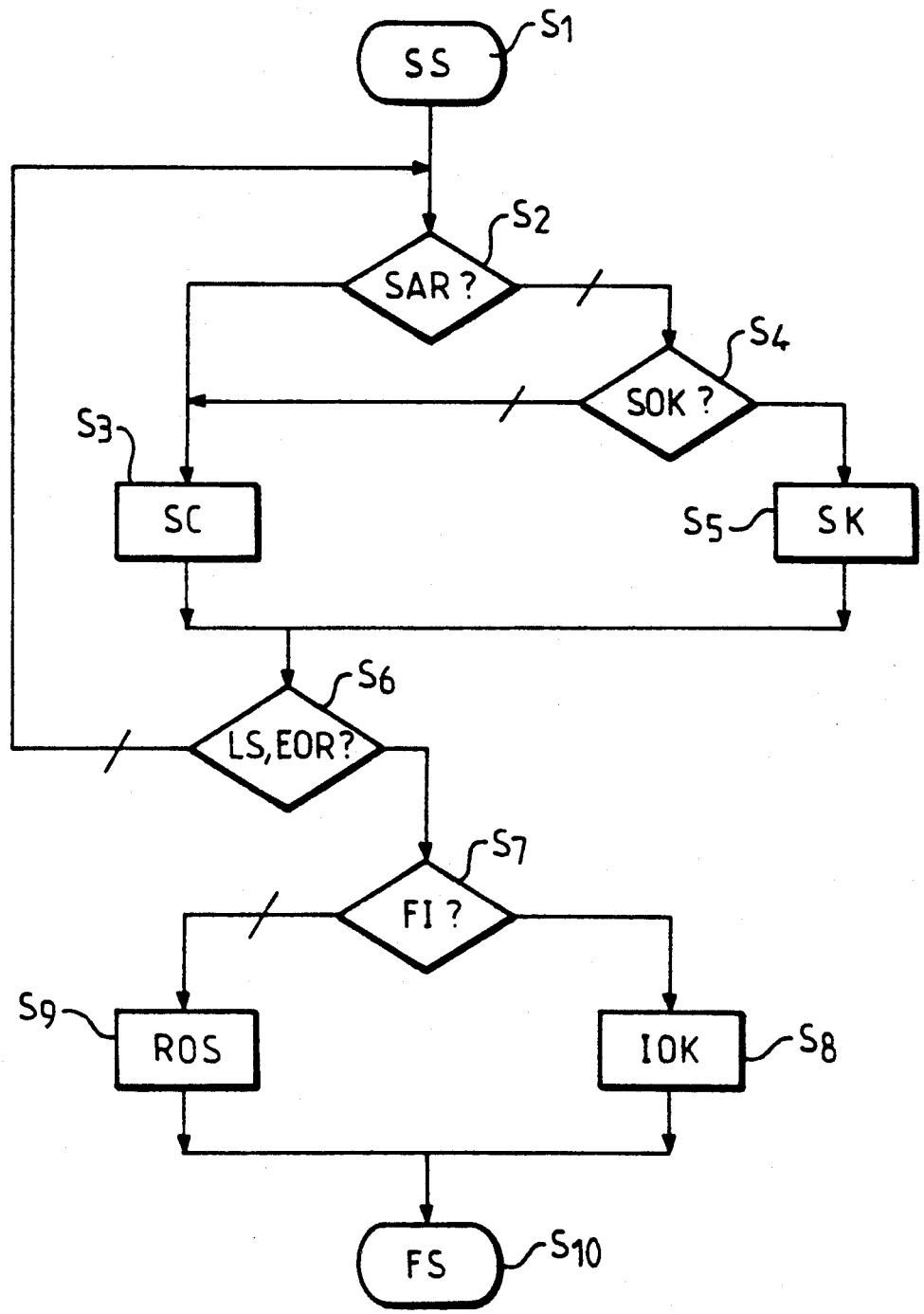
FIG. 3 shows an exemplary embodiment of the method according to the invention in the restoration phase of the information.
Figure 4:
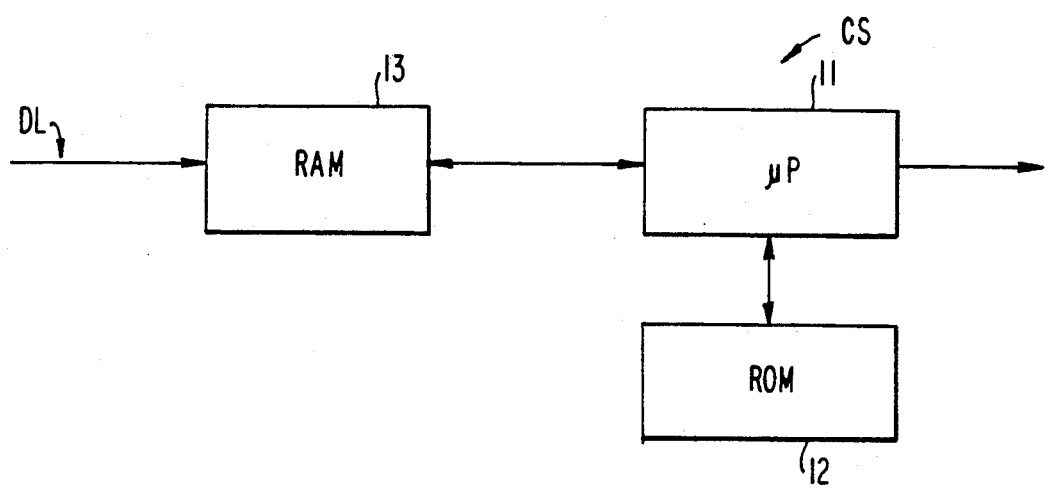
FIG. 4 is a block diagram of 9 central station of the network of FIG. 2.

In FIG. 3 is shown a possible diagrammatic representation of the separate stages of the restoring method effected by the arrangement RSD. According to this method the received fragments are stored and analysed one by one in a first time interval, the analysis consisting of verifying in a first time interval whether the fragment has already been received or is not correct so that it is eliminated or whether it has not yet been received and is correct so that it is retained and this up to the last fragment specifying the end of the reception of information signals and also, in a second time interval, whether the complete information has been received so that it can be evaluated or has not been received completely so that a repetition of the sending of fragments that have not been received can be requested.

Thus, in FIG. 3, at the initial stage S1 the fragments are stored SS, after which they are analysed one by one in a first time interval. At stage S2 a question is asked SAR?: "Has the fragment already been received?". If the reply is affirmative the next stage will be S3 during which the fragment will be eliminated, as indicated by the step SC. If the reply is negative, the question SOK?: "Is the fragment correct?" will be asked at the next stage S4. If the reply is negative the next stage will again be stage S3 for which the fragment will be eliminated by the step SC. If the reply is affirmative, the fragment will be retained, as indicated by the step SK, which is stage S5. At stage S6 which follows stage S3 or S5, the question LS, EOR? is asked: "Is this the last fragment or is this the end of the reception?". If the reply is negative, stage S2 will be returned to, then the following stages, and this will take place up to the last information fragment. If the reply is affirmative, stage S7 will be proceeded to during which the question FI? will be asked: "Has the information been received completely?". If the reply is affirmative, then information will be validated as indicated by the step IOK, performed by stage S8. If the reply is negative, a repetition will be requested of the fragments not received correctly, as indicated by the step ROS, stage S9. Stage S10 follows stage S8 or S9, which is performed by the final stage FS after which are expected to be analysed either the fragments received incorrectly of the previous information signal or the fragments of new information signals.

Such a method of information transmission is advantageous because it makes it possible to effectively avoid the information losses without requiring a robust and cumbersome control to select the fixed receive stations for taking changes of location of the mobile stations into account.

In a preferred embodiment this method may be applied to a network for data transmission presenting to the various users, on the basis of specially adapted terminals, the possibility to interrogate remote data banks and exchange information or messages while fully optimising the use of radio resources. Exchanging, capturing and processing of information is effected in real time promoting communication in space and in time. Furthermore, with this system it is possible, if necessary, to encode the data passing in the transmission network.

I claim:

1. A method of radio transmission of information from a mobile station to a central station via a plurality of fixed receive stations having overlapping service areas, when said mobile station is located in one or more of said service areas comprising:
   (a) at the mobile station, breaking up into fragments the information to be transmitted, and encoding each fragment with an error correction code;
   (b) at the mobile station, sequentially transmitting said fragments;
   (c) at each fixed receive station, receiving fragments transmitted from the service area of said receive station;
   (d) at each fixed receive station, sending received fragments to the central station;
   (e) at the central station, storing fragments forming part of one information received from more than one fixed receive station;
   (f) at the central station, determining whether the stored fragments include at least one correct fragment of each of said fragments constituting said information, said determining step including using said error correction code;
   (g) at the central station, initiating a request to said mobile station to retransmit each corresponding fragment constituting said information as to which said at least one correct fragment had not been stored; and
   (h) at at least one of said fixed receive stations, receiving fragments transmitted from said mobile station in response to step (g), and sending such fragments to said central station;
   (i) at the central station, determining whether such fragments are correct said corresponding fragments;
   (j) repeating steps (e) through (i) as required until determination that at least one said correct fragment of each of said fragments constituting said information has been stored; and then (k) combining said one said correct fragments to restore said information, whereby said information can be restored from some said fragments received by one of said fixed receive stations and other said fragments received by at least one other of said fixed receive stations.

2. A method as claimed in claim 1, wherein said determining comprises sequentially analyzing fragments sent to said central station by verifying when a currently analyzed fragment has not already been received and has been received correctly.

3. A system for radio reception of information from a mobile station, which information is transmitted by the mobile station in sequential fragments that include an error correction code, comprising:

a central station;

a plurality of fixed receive stations having overlapping service areas, each fixed receive station comprising means for receiving fragments transmitted from a mobile station which said mobile station is located in the service area of said fixed receive station and means for sending received fragments to said central station;

wherein said central station comprises:

(a) means for receiving and storing all said fragments sent from said plurality of fixed receive stations;

(b) means, using said error correction code, for determining whether the stored all said fragments include at least one correct fragment of each of said fragments constituting said information;

(c) means for initiating a request to said mobile station to retransmit each corresponding fragment constituting said information as to which said at least one correct fragment had not been stored;

(d) means for receiving and storing fragments sent by any of said fixed receive stations in response to such retransmission, and determining whether such fragments are correct said corresponding fragments;

(e) means for repeating initiation of said request, receiving and storing fragments, and determining correctness and completeness of the stored fragments, until determination that at least one said correct fragment of each of said fragments constituting said information has been stored; and (f) means for combining said one said correct fragments to restore said information, whereby said central station can restore said information from some said fragments received by one of said fixed receive stations and other said fragments received by at least one other of said fixed receive stations.

4. A system as claimed in claim 3, wherein said means for determining comprises means for sequentially analyzing fragments sent to said central station by verifying when a currently analyzed fragment has not already been received and has been received correctly.

5. A central station for use in a system for radio reception of information transmitted from a mobile station, in sequential fragments that include an error correction code, the system including a plurality of fixed receive stations having overlapping service areas, and each fixed receive station including means for sending received fragments to said central station, wherein said central station comprises:

(a) means for receiving and storing all said fragments sent from said plurality of fixed receive stations;

(b) means, using said error correction code, for determining whether the stored all said fragments include at least one correct fragment of each of said fragments constituting said information;

(c) means for initiating a request to said mobile station to retransmit each corresponding fragment constituting said information as to which said at least one correct fragment had not been stored;

(d) means for receiving and storing fragments sent by any of said fixed receive stations in response to such retransmission, and determining whether such fragments are correct said corresponding fragments;

(e) means for repeating initiation of said request, receiving and storing fragments, and determining correctness and completeness of the stored fragments, until determination that at least one said correct fragment of each of said fragments constituting said information has been stored; and (f) means for combining said one said correct fragments to restore said information, whereby said central station can restore said information from some said fragments received by one of said fixed receive stations and other said fragments received by at least one other of said fixed receive stations.

* * * * *